F. C. MARTIN & J. W. SMITH.
PROTECTING SAFE.
APPLICATION FILED SEPT. 20, 1909.

943,437.

Patented Dec. 14, 1909.
2 SHEETS—SHEET 1.

Witnesses:
D. W. Gardner.

Inventors:
Frederick C. Martin
Joseph W. Smith

F. C. MARTIN & J. W. SMITH.
PROTECTING SAFE.
APPLICATION FILED SEPT. 20, 1909.
943,437.
Patented Dec. 14, 1909.
2 SHEETS—SHEET 2.
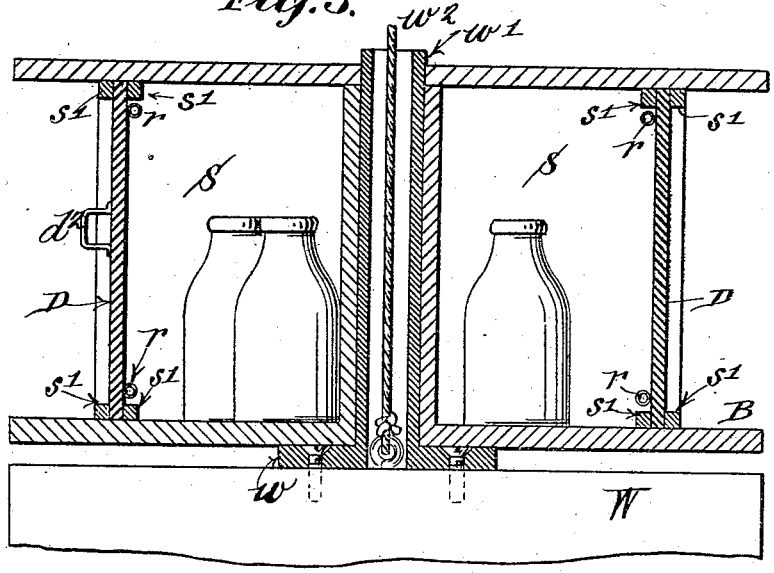
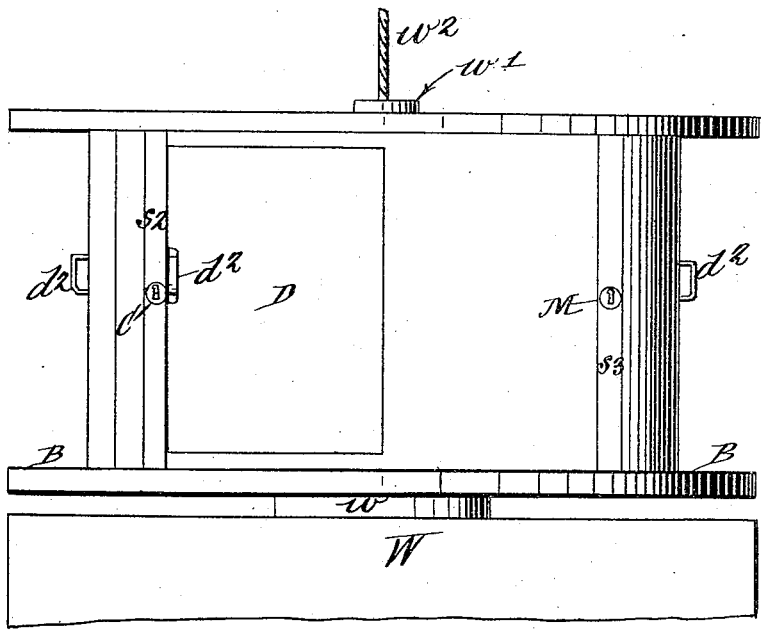

UNITED STATES PATENT OFFICE.

FREDERICK C. MARTIN AND JOSEPH W. SMITH, OF NEW YORK, N. Y.

PROTECTING-SAFE.

943,437.  Specification of Letters Patent.  Patented Dec. 14, 1909.

Application filed September 20, 1909. Serial No. 518,644.

*To all whom it may concern:*

Be it known that we, FREDERICK C. MARTIN and JOSEPH W. SMITH, citizens of the United States, residing in the borough of Manhattan, city, county, and State of New York, have invented certain new and useful Improvements in Protecting-Safes, of which the following is a specification.

The object of our invention is to provide means whereby bottled milk may be safeguarded after delivery by the milk man under ordinary conditions prevalent in cities, as for instance where it is customary to leave the bottles of milk upon dumb waiters for removal at the customer's convenience. It is well known that under present conditions much milk is stolen or tampered with, resulting in loss and inconvenience to the customer &c. These objectionable features we eliminate by our invention which consists in the specific combination and arrangement of parts herein described and claimed, a distinguishing feature being the use of a milk bottle protecting safe which can only be closed by the milk man and only opened by the individual customer substantially as hereinafter set forth.

Figure 1:
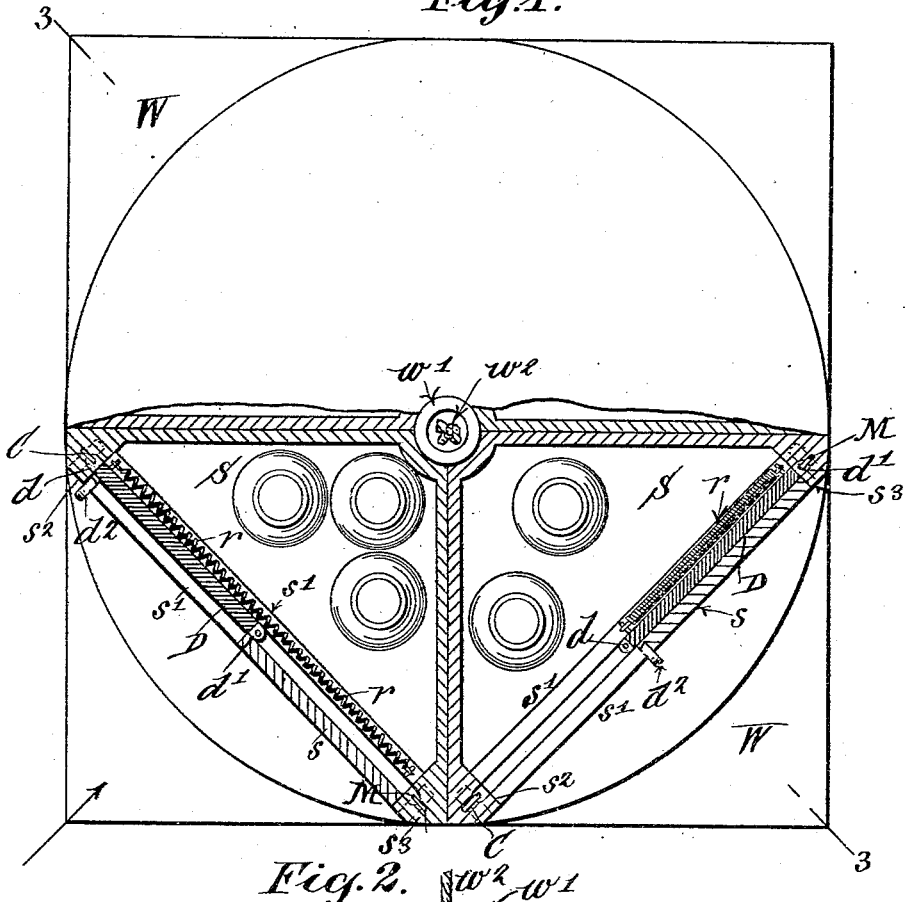
Figure 2:
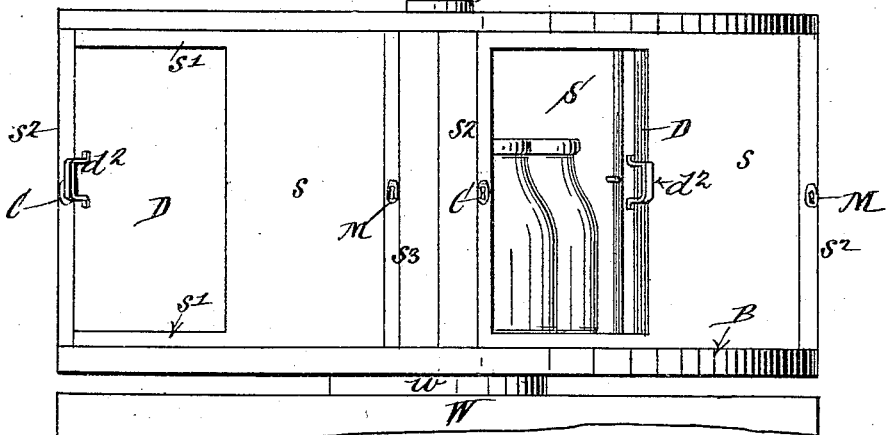

In the accompanying drawings, Figure 1, is a top view of a nest of four of our milk protecting safes mounted on top of a dumb waiter, the upper portions of two being broken away to show the interiors; Fig. 2, is a side elevation of the same; Fig. 3, is a vertical section taken upon plane of line 3—3— Fig. 1; Fig. 4, is an elevation looking in the direction in which the arrow points in Fig. 1.

We have herein shown and described, by way of illustrating the principle involved, our invention as adapted and applied to a dumb waiter such as used in modern apartment houses, although we do not necessarily restrict ourselves to this specific use, as substantially the same arrangement may be used, for instance, in the area-ways of private houses and in other situations where bottled milk is delivered subject to subsequent removal by a customer or customers.

In the drawings W represents the top portion of a dumb waiter such as ordinarily employed in an apartment house. On top of this dumb waiter are grouped and mounted four of our milk protecting safes S, although the number is not material, and depends on the number of tenants provided for in the particular dumb waiter shaft. These receptacles are secured preferably to a circular base B, which constitutes a turn table resting upon a suitable step $w$, on the top of the dumb waiter W. This step $w$, is formed with a vertical hollow section $w'$, which surrounds the hoist rope $w^2$, and, together with the step $w$, constitutes a hub on which the series of receptacles S may be freely rotated.

Each receptacle S constitutes an individual safe or compartment for one of the tenants whose apartments are served by the dumb waiter W, each safe being suitably marked by number or name.

The front of each safe is formed with a stationary wall $s$, and provided with a sliding door D, running in guide ways $s'$, $s'$, on the top and bottom of the compartment.

Retractile springs $r$, $r$, attached to the door and to the inner wall of the compartment tend constantly to draw the door D open. The front and rear edges of the door are each formed with a staple or eye $d$, $d'$, or equivalent mechanical expedient for engagement with locking mechanism. The lock C, for the staple $d$, is situated in the jamb or front post $s^2$ of the doorway, and may be designated as the customer's lock, it being opened only by an individual key in the possession of the customer. The other, or milk-man's lock M, is situated in the rear post $s^3$, of the doorway and can be operated only by a special key in the possession of the milk man. The locks C and M may be of any suitable form or class, such as the Yale or other commercial lock, the only prerequisite being that the customers' locks C, shall each be provided with a special, individual key, while the milk-man's locks are opened by a key common to all.

Under normal conditions of use, when the milk man arrives with the bottles of milk he finds each door D, locked open, from which position it can only be released by his key. After placing the bottles of milk in a safe compartment S, he releases the door D, from the lock M, by means of his key, and closes it against resistance of the springs $r$, $r$, the staple $d$, being engaged automatically with the customer's lock C, thereby locking the door closed, and securing and protecting the milk until the staple $d$, is released from the customer's lock C, when the springs $r$, $r$, retract the door D, until again locked automatically in the open position by reason of the engagement of the staple $d'$, with the milk man's lock M. The door D is preferably provided with a handle $d^2$, to facilitate the closing thereof. This method of automatically locking the door open as soon as released from the customer's key is an important feature of our invention, in practice, since it prevents the accidental re-closing of the door, in which event the device would be useless for the purpose designed.

It will be seen that by our invention we effectually protect and safeguard the milk from the moment it is delivered by the milk man until received by the customer.

It is to be understood that while we have herein described the invention as applied to the safeguarding of bottled milk, our invention is equally applicable for use in connection with groceries or other goods or articles to be delivered to customers. For instance the grocery man may obviously be substituted for the milk man in the foregoing specification with like effect.

What we claim as our invention and desire to secure by Letters Patent is,

1. In a protecting safe of the character described, a compartment formed with a door opening, a slidable door adapted to close said opening, lock mechanism arranged to lock said door in its open position, and locking mechanism arranged to lock said door in its closed position, substantially as and for the purpose set forth.

2. In a protecting safe of the character described, a compartment formed with a door opening, a slidable door adapted to close said opening, locking mechanism arranged to lock said door in its open position, and locking mechanism arranged to lock said door in its closed position, and means for automatically retracting the door and locking it in its open position, when released from its closed position, substantially as and for the purpose set forth.

3. In a protecting safe of the character described, a plurality of compartments, each formed with a door opening, a slidable door adapted to close said opening, locking mechanism arranged to lock said door in its closed position, an individual key for releasing said locking mechanism, locking mechanism arranged to lock said door in its closed position, and a key common to all the compartments and adapted to release any and all of the doors from their open positions, substantially as and for the purpose set forth.

4. In a protecting safe of the character described, a plurality of compartments, each formed with a door opening, a slidable door adapted to close said opening, means for automatically retracting and opening the door when released from its closed position, locking mechanism arranged to lock said door in its closed position, an individual key for releasing said locking mechanism, locking mechanism arranged to lock said door in its closed position, and a key common to all the compartments and adapted to release any and all of the doors from their open positions, substantially as and for the purpose set forth.

FREDERICK C. MARTIN.
JOSEPH W. SMITH.

Witnesses:
D. W. GARDNER,
GEO. WM. MIATT.